W. SPARKS.
MACHINE FOR COATING OR ENAMELING PAPER.
No. 11,461. Reissued Jan. 1, 1895.
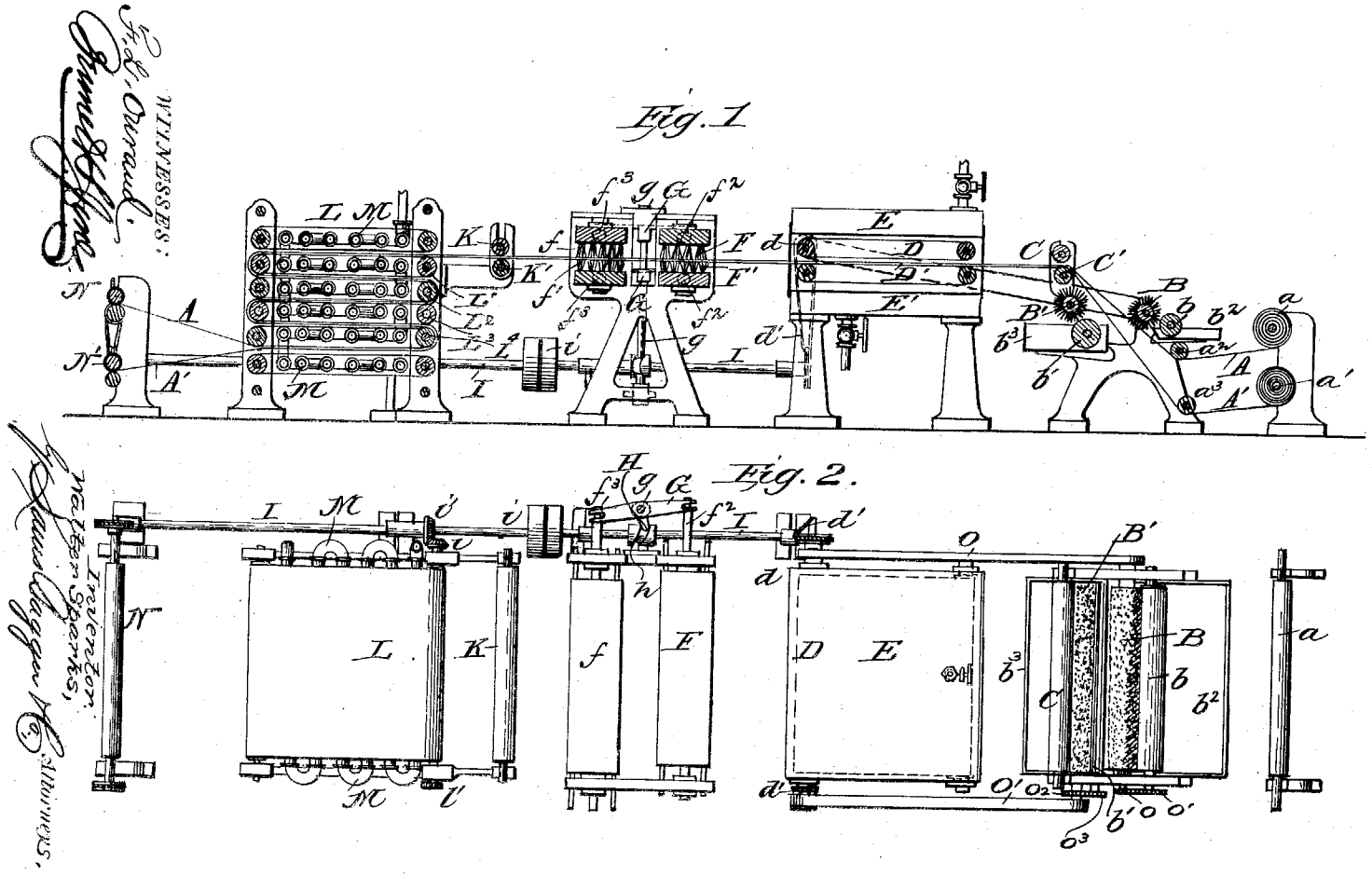

UNITED STATES PATENT OFFICE.

WALTER SPARKS, OF BROOKLYN, NEW YORK.

MACHINE FOR COATING OR ENAMELING PAPER.

SPECIFICATION forming part of Reissued Letters Patent No. 11,461, dated January 1, 1895.

Original No. 510,098, dated December 5, 1893. Application for reissue filed July 14, 1894. Serial No. 517,611.

*To all whom it may concern:*

Be it known that I, WALTER SPARKS, a citizen of the United States, residing in the city of Brooklyn, in the county of Kings and State of New York, have invented certain new and useful Improvements in Machines for Coating or Enameling Paper; and I do hereby declare that the following is a full, clear, and exact description of the invention, which will enable others skilled in the art to which it appertains to make and use the same, reference being had to the accompanying drawings, and to the letters of reference thereon, which form part of this specification.

This invention relates to machines for coating or enameling paper in a continuous web, either on both sides of the web, or on one side only, as may be desired; and it consists in the novel construction and combination of parts for drying and finishing the colored or enameled web of paper after it leaves the brushes which apply the coating of color or enamel in a liquid form; substantially as will be hereinafter more fully described and particularly pointed out in the claims.

On the accompanying drawings: Figure 1 is a longitudinal sectional view, on a vertical plane, of my machine; and Fig. 2 is a top view, or plan, of the same.

Like letters of reference designate corresponding parts in both the figures.

In the present illustration of my machine, I have shown it as adjusted or adapted to coating simultaneously, one side only of each of two continuous webs of paper, viz: the upper side or face of one web or strip, and the under side of an adjacent web or strip; the sides of the two webs which are not to be coated being adjacent to and facing each other as they pass through the machine. It is optional, however, whether two such adjacent webs of paper are to be coated or enameled, each one on the one side only; or whether a single web of paper is to be coated or enameled on both sides simultaneously, as it does not require any reorganization of the parts of the machine, but simply the readjustment of the brushes and feed rollers, to adapt the machine for either purpose.

The two continuous webs of material to be treated, shown at A and A′ are fed to the machine from suitable supply rolls $a$ and $a'$, from which they pass under suitably adjusted guide-rollers $a^2$ and $a^3$, to the revolving brushes B and B′, which apply the liquid coating or enameling material to the contiguous sides of the paper in contact with them. These coating or enameling brushes receive their supply of liquid material from receptacles $b^2$ and $b^3$ by means of supply rollers $b$ and $b'$. After receiving their coating of color or enamel at the brushes B and B′, the two strips of web, while still wet, are conducted by suitably arranged guide-rollers C and C′, in between a pair of endless aprons, D, D′, composed of some suitable, tenacious and pervious soft material (such for example, as felt), and located within hot boxes E, E′, adapted to admit a circulation of air, more or less freely, through suitable openings.

The materials of which the aprons are composed is of such a nature that it will absorb and retain heat, so to effect the partial drying of the coating or enamel which has been placed upon the webs of paper in a liquid state; and as these aprons, D and D′, are, moreover, positively driven, they also serve to feed the webs of paper forward in a manner which will be hereinafter more fully referred to. This device, inasmuch as it operates to partially dry the webs of paper as they are received from the coating or enameling brushes, I call the "first or preliminary drier," to distinguish it from the "second or finishing drier," which will be described later on. After leaving the aprons of this preliminary drier, the coated and partially dried webs A and A′ are fed forward to and between two sets of upper and lower polishing or burnishing brushes, which are made to reciprocate back and forth across the upper and lower faces of the webs as these are fed along between them. The upper and lower brushes of one of these sets are shown at F and F′, and the upper and lower brushes of the second set at $f$ and $f'$. Both sets of brushes are mounted in suitable bearings by means of stems projecting from opposite ends; the stems marked $f^2$ and $f^3$, projecting from the corresponding ends of the two pairs, being extended beyond the bearings and yoked together by a vibrating yoke G, fastened upon an upright rock-shaft $g$. This rock shaft is provided with a projection $g'$, the free end of which engages a groove, $h$, in the rotary cam H, which is fastened upon and revolves with the drive-shaft I. It follows that as cam H rotates, the shaft $g$ will be rocked or oscillated so as to vibrate the yoke G, and thus reciprocate the two sets of polishing brushes in a horizontal plane in alternately opposite directions, and at right angles to, and across the opposite sides or faces of, the webs of paper fed between them. From these polishing or burnishing brushes the webs A and A′ are carried between a pair of guide-rollers, K and K′, to the "second or finishing drier," which consists of a stack of endless aprons, L, L′, $L^2$, $L^3$, $L^4$, and $L^5$. The number of such aprons comprising the stack may be three or more. In the present instance, I have shown six such aprons as comprising the stack of this second drier; and these aprons, which, like those of the first or preliminary drier, are formed of felt, or some other soft tenacious, and pervious material, are kept heated to the desired degree for completing the drying process by means of coils of steam pipe, M, which are interposed between the opposite parts of each of the several aprons. The webs A and A′ are fed alternately forward and backward between the individual aprons comprising the stack, which comprises a sufficient number of adequately heated aprons to thoroughly complete the drying and hardening of the coated or enameled surfaces of the paper. The endless aprons are so arranged in the stack that the opposite or contiguous infringing sides or faces of adjacent aprons travel in the same direction, in order to enable them to feed the webs of paper alternately forward and back in passing through the stack until, having been thoroughly dried, they leave the same at the bottom, being fed forward and out of the stack by passing between the adjacent this process of drying has been accomplished faces of the two lowermost aprons. After by this "second or finishing drier," the webs of coated or enameled paper may be separated (where more than a single web is under treatment in the machine), and led away to suitable receiving or take-up rolls, N, N′. It is intended that the heated aprons of the second drier, by proper adjustment, should operate—in addition to their function as driers—to feed the paper forward; the several aprons of both driers taking an extended, soft, and gentle grip, by friction, upon the contiguous webs of paper, so that even when these are of thin texture and easily torn, there will be no danger of their becoming overstrained or ruptured while fed forward by the several aprons appertaining to the first and second driers.

It will be obvious that the movements of the several operative parts of this machine must be properly timed with reference to one another, so as to act in unison and feed the paper web or webs forward and through the machine at a regular and even, predetermined, rate of speed.

On the drawings I have shown the several movable parts of the machine actuated as follows: Motion is communicated from a steam engine, or other suitable motor (not shown) to the drive-pulley $i$ on the rotary drive-shaft I. A bevel-gear, $i'$, on shaft I engages another bevel gear, $l$, on one of the rollers or drums which carry one of the stacks of endless aprons comprising the second or finishing drier (in the present instance, the lower one); and motion is communicated from this to the other drums by means of intermeshing gear-wheels, $l'$, on the opposite ends of the drums. The mechanism for operating the reciprocating polishing or burnishing brushes by shaft I has already been explained. Motion is imparted from this shaft to one of the drums $d$ of the first or preliminary drier by means of a band $d'$; and motion is imparted from the drum $d$ to its companion drum by means of a gear, $d^2$, upon the opposite end of drum $d$. From this, motion is communicated to one of the coating or enameling brushes, B, by means of a belt O, and from the opposite end of said companion drum, by means of a belt O′, to the other coating or enameling brush B′. Brush B is geared with the roller $b$ by suitable intermeshing gears $o$, $o'$; and its companion-brush B′ is similarly geared with its roller $b'$ by means of intermeshing gears $o^2$ and $o^3$.

Having thus described my invention, what I claim as my improvement, and desire to secure by Letters Patent of the United States, is as follows:

1. In a machine for coating or enameling paper, the combination with the coating-applying brushes and the polishing-brushes, of two sets of combined driers and feeders, viz: a "first or preliminary drier" located between the coating-applying brushes and the polishing or burnishing brushes; and a "second or finishing drier" located in front of said polishing brushes, for the final drying and finishing of the web or webs of coated or enameled paper; said second or finishing drier consisting of a stack of endless aprons, with intermediate heating-pipes, constructed and arranged to feed the web or webs of paper alternately forward and back as it passes between contiguous impinging sides of the drying-aprons traveling in the same direction; substantially as set forth.

2. The coating or enameling machine comprising the coating-applying brushes between which the strip or strips of material pass; the combined feeding-and-drying endless aprons for receiving the strip or strips from the coating-brushes; the vibrating polishing-brushes adapted to engage the opposite faces of the strip or strips; and the stack of endless combined feeding-and-drying aprons arranged to feed the strip of material alternately forward and back between contiguous impinging faces of adjacent aprons traveling in the same direction; substantially as set forth.

3. The coating or enameling machine, comprising the coating-applying brushes between which the strip or strips of material pass; the combined feeding and drying endless aprons for receiving the strip or strips from the coating-brushes; the vibrating polishing-brushes adapted to engage the opposite faces of the strip or strips; and the stack of drying and feeding-aprons for completing the coating; substantially as set forth.

In testimony whereof I have hereto affixed my signature in the presence of two witnesses.

WALTER SPARKS.

Witnesses:

O. M. CHACE,

GEO. H. SOUTHER.